(12) United States Patent
Chen et al.

(10) Patent No.: US 9,297,878 B2
(45) Date of Patent: Mar. 29, 2016

(54) LIGHT SOURCE ORIENTATION DETECTOR

(75) Inventors: Gang Chen, Basking Ridge, NJ (US); Oleg Mitrofanov, New York, NY (US); Ronen Rapaport, Millburn, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 776 days.

(21) Appl. No.: 11/399,924

(22) Filed: Apr. 7, 2006

(65) Prior Publication Data

US 2007/0237473 A1    Oct. 11, 2007

(51) Int. Cl.
*G02B 6/28* (2006.01)
*G02B 6/04* (2006.01)
*G01S 3/781* (2006.01)
*G01J 1/04* (2006.01)
*G01J 1/42* (2006.01)
*G02B 6/02* (2006.01)

(52) U.S. Cl.
CPC . *G01S 3/781* (2013.01); *G01J 1/04* (2013.01); *G01J 1/0425* (2013.01); *G01J 1/4228* (2013.01); *G02B 6/02057* (2013.01); *G02B 6/04* (2013.01)

(58) Field of Classification Search
CPC .............................. G02B 6/02057; G02B 6/04
USPC ....................................................... 385/115
See application file for complete search history.

(56) References Cited

U.S. PATENT DOCUMENTS

| 3,757,127 | A | * | 9/1973 | Dhaka | 250/227.24 |
| 4,721,852 | A | | 1/1988 | Muller | |
| 4,880,305 | A | | 11/1989 | Salt et al. | |
| 5,337,382 | A | | 8/1994 | Mizrahi | 385/37 |
| 5,585,735 | A | * | 12/1996 | Takahashi et al. | 324/754.23 |
| 5,982,962 | A | | 11/1999 | Koops et al. | |
| 6,002,822 | A | | 12/1999 | Strasser et al. | 385/48 |
| 6,411,755 | B1 | * | 6/2002 | Erdogan | 385/28 |
| 6,490,388 | B1 | | 12/2002 | Manzur | |
| 6,856,729 | B2 | | 2/2005 | Davis et al. | 385/37 |
| 6,904,198 | B2 | * | 6/2005 | Dykaar | 385/31 |

(Continued)

FOREIGN PATENT DOCUMENTS

DE        4301477        12/1993
EP        1569020        8/2005

(Continued)

OTHER PUBLICATIONS

Jeff Hecht, "Fiber Gratings", printed from http://zone.ni.com/devzone/conceptd.nsf/webmain/080AFC23551D7FC886256C24004C4D58 on Feb. 24, 2006.

(Continued)

*Primary Examiner* — Uyen Chaun N Le
*Assistant Examiner* — Chris Chu
(74) *Attorney, Agent, or Firm* — Jay Brown Law Firm

(57) ABSTRACT

Apparatus including: an optical waveguide bundle including a plurality of optical waveguides substantially aligned along a waveguide bundle axis, each optical waveguide having a longitudinal core configured to transmit light; a plurality of the optical waveguides each including a Bragg reflector, the Bragg reflectors configured to couple light incident from a direction substantially transverse to the waveguide bundle axis into the optical waveguides in a propagating mode in the longitudinal cores; and each of a plurality of longitudinal cores being in optical communication with an optical detector configured to detect light transmitted in the longitudinal cores.

17 Claims, 6 Drawing Sheets

(56) References Cited

U.S. PATENT DOCUMENTS

| | | | |
|---|---|---|---|
| 7,106,928 B2* | 9/2006 | Dykaar | 385/31 |
| 2005/0180699 A1* | 8/2005 | Shu et al. | 385/89 |
| 2005/0185885 A1* | 8/2005 | Onaka et al. | 385/24 |
| 2006/0013527 A1 | 1/2006 | Morel et al. | |
| 2006/0067617 A1* | 3/2006 | Gaylord et al. | 385/37 |

FOREIGN PATENT DOCUMENTS

| | | |
|---|---|---|
| GB | 2274924 A | 10/1994 |
| GB | 2330263 | 4/1999 |
| JP | S61-151432 A | 7/1986 |
| JP | H06-249937 A | 9/1994 |
| JP | 2005-241712 A | 9/2005 |
| WO | WO9844366 | 10/1998 |

OTHER PUBLICATIONS

Paschotta, "High-power Fiber Lasers and Amplifiers," RP Photonics Encyclopedia, (RP Photonics Consulting GmbH, Germany), 10pp., downloaded on Apr. 8, 2014 from the Internet at: http://www.rp-photonics.com/high_power_fiber_lasers_and_amplifiers.html.

Huang et al., "Direct Side Pumping of Double-Clad Fiber Laser by Laser Diode Array Through the Use of Subwavelength Grating Coupler," IEEE Photonics Journal, vol. 4, No. 2, Apr. 2012, pp. 411-421 (IEEE Photonics Society, US).

Hill et al., "Fiber Bragg Grating Technology Fundamentals and Overview," Journal of Lightwave Technology, vol. 15, No. 8, Aug. 1997, pp. 1263-1276 (IEEE Xplore, US).

European Patent Office Communication pursuant to Article 94(3) EPC, in European patent application 07755089.5-1553 (being a counterpart of this U.S. Appl. No. 11/399,924), dated Dec. 4, 2014; 6 pages.

* cited by examiner

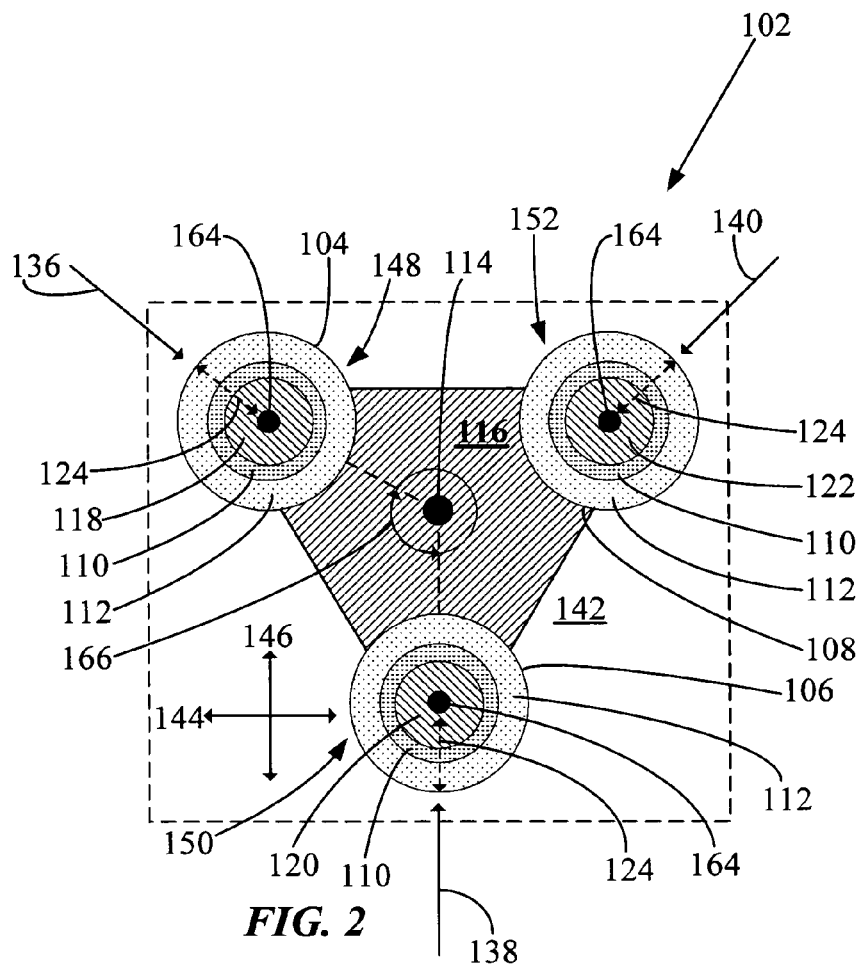
FIG. 2
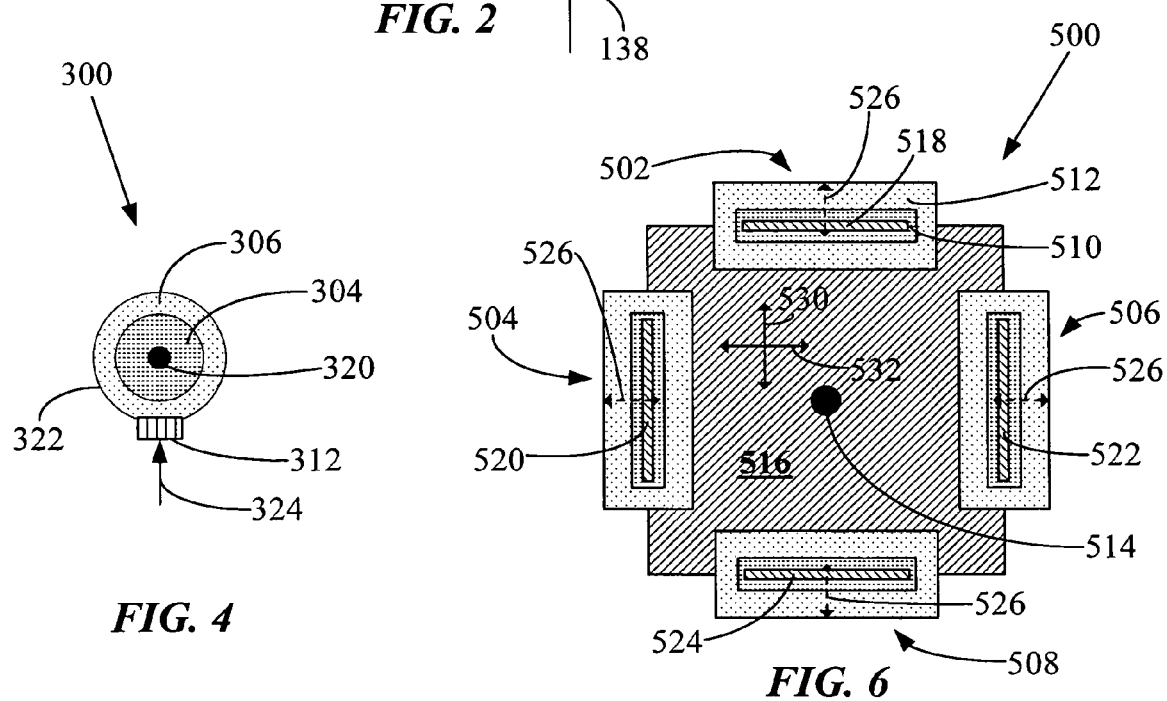
FIG. 4
FIG. 6

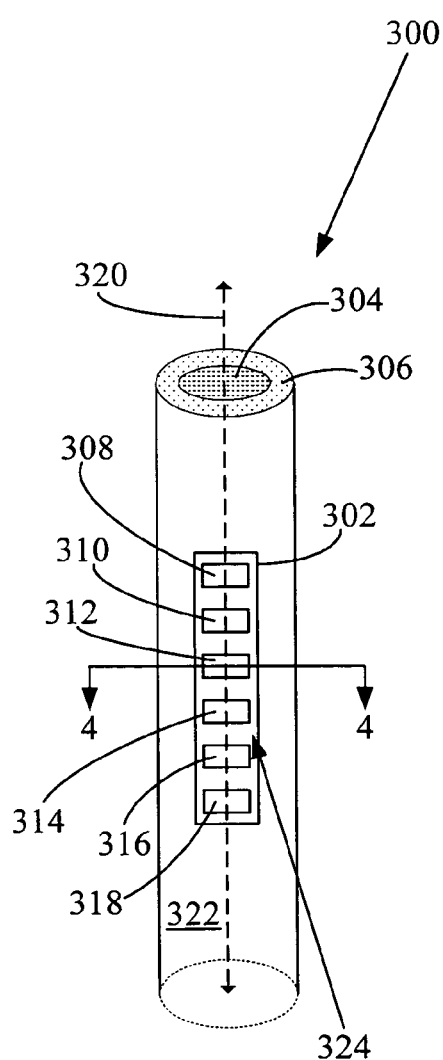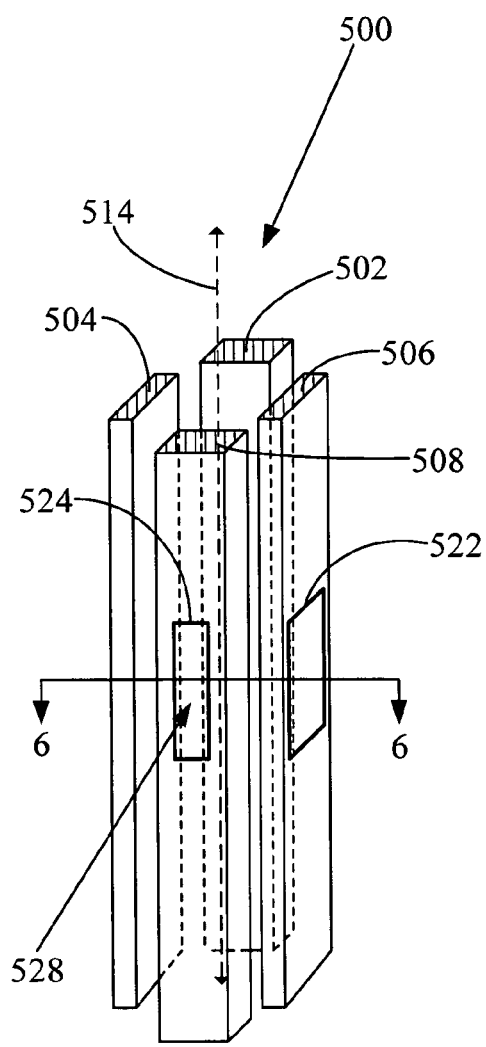
FIG. 3
FIG. 5

LIGHT SOURCE ORIENTATION DETECTOR

BACKGROUND OF THE INVENTION

1. Field of the Invention

This invention relates generally to light source orientation detectors.

2. Related Art

Many types of systems exist for the detection of light. Further, systems exist that are specifically configured for detection of an orientation of a light source relative to a light detector. Some light detection systems include complex, precise and delicate instrumentation designed to maximize the accuracy of light source orientation information derived by these systems. Other light detection systems are bulky, heavy, require complex support systems for their operation, and are not readily portable. Many of these light detection systems generally also require careful attention to protecting the systems from damage and from being moved or otherwise disturbed during determination of light source orientation information.

In some circumstances, detection of an orientation of a light source relative to a light detector in a field environment may be needed. In such an environment, laboratory standards of care for a light detection system may not be practical, either to isolate the system from outside environmental forces during determination of light source orientation information or to protect the system from damage due to shocks, wear and tear, and other hazards. There accordingly is a continuing need for apparatus adapted to determine light source orientation information under field conditions where laboratory controls over the environment are not practical.

SUMMARY

In an implementation example, an apparatus is provided that includes: an optical waveguide bundle including a plurality of optical waveguides substantially aligned along a waveguide bundle axis, each optical waveguide having a longitudinal core configured to transmit light; a plurality of the optical waveguides each including a Bragg reflector, the Bragg reflectors configured to couple light incident from a direction substantially transverse to the waveguide bundle axis into the optical waveguides in a propagating mode in the longitudinal cores; and each of a plurality of longitudinal cores being in optical communication with an optical detector configured to detect light transmitted in the longitudinal cores.

In another example, a process is provided, including: forming a Bragg reflector integrally with each of a plurality of optical waveguides, the optical waveguides each having a longitudinal core configured to transmit light; forming an optical waveguide bundle including a plurality of the optical waveguides substantially aligned along a waveguide bundle axis, each Bragg reflector configured to couple light incident from a direction substantially transverse to a waveguide bundle axis into an optical waveguide in a propagating mode in a longitudinal core; and placing a plurality of the longitudinal cores in optical communication with an optical detector configured to detect light transmitted in the longitudinal cores.

As a further implementation, a method of determining light source orientation information is provided, including: providing an apparatus, having: an optical waveguide bundle including a plurality of optical waveguides substantially aligned along a waveguide bundle axis, each optical waveguide having a longitudinal core configured to transmit light; a plurality of the optical waveguides each including a Bragg reflector, the Bragg reflectors configured to couple light incident from a direction substantially transverse to the waveguide bundle axis into the optical waveguides in a propagating mode in the longitudinal cores; each of a plurality of longitudinal cores being in optical communication with an optical detector configured to detect light transmitted in the longitudinal cores, generating light detection data; and a processor configured to integrate light detection data into light source orientation information; positioning the optical waveguide bundle for exposure to a light source to be detected; generating light detection data from light incident from a direction substantially transverse to the waveguide bundle axis into an optical waveguide; and integrating the light detection data into light source orientation information.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

FIG. 2 is a cross-sectional view taken on line 2-2 showing the optical fiber bundle from the Light Source Orientation Detector of FIG. 1.

FIG. 3 is a perspective view showing an optical fiber, having a Bragg reflector in the form of a prism row, which may be included in an optical fiber bundle.

FIG. 4 is a cross-sectional view taken on line 4-4 showing the optical fiber of FIG. 3.

FIG. 5 is a perspective view showing a planar waveguide bundle that may be included in a Light Source Orientation Detector.

FIG. 6 is a cross-sectional view taken on line 6-6 showing the planar waveguide bundle of FIG. 5.

DETAILED DESCRIPTION

Figure 1:
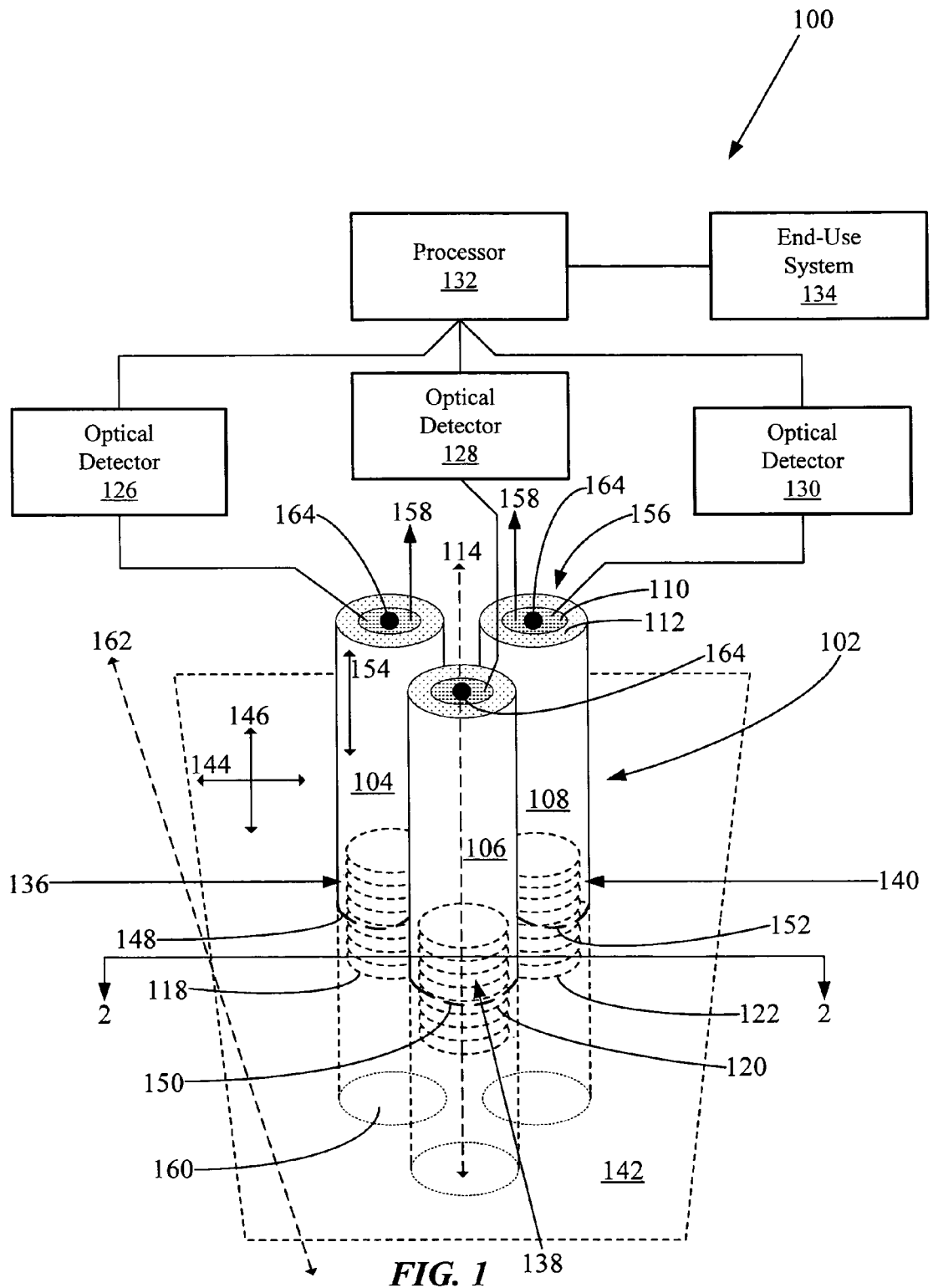
FIG. 1 is a perspective view showing a Light Source Orientation Detector including an optical fiber bundle.

FIG. 1 is a perspective view showing a Light Source Orientation Detector 100 including an optical fiber bundle 102. FIG. 2 is a cross-sectional view taken on line 2-2 showing the optical fiber bundle 102 from the Light Source Orientation Detector 100 of FIG. 1.

The optical fiber bundle 102 may, as an example, include three optical fibers 104, 106 and 108. In an implementation, each of the optical fibers 104-108 may include a longitudinal core 110. As another example, each longitudinal core 110 may be surrounded by a cladding 112. As an example, each of the optical fibers 104-108 may further include a protective jacket (not shown) on and surrounding the longitudinal core 110 and if present, the cladding 112. The optical fibers 104-108 may be spaced apart around and substantially aligned along a waveguide bundle axis 114. It is understood that "substantially aligned along a waveguide bundle axis" as used throughout this specification means that each of the optical fibers 104-108 may either be oriented substantially parallel with the waveguide bundle axis, or the optical fibers 104-108 may form a helix (not shown). As an example, a waveguide bundle core 116 (shown in FIG. 2 but omitted from FIG. 1) may be interposed between the optical fibers 104-108, holding the optical fibers in spaced apart alignment.

In an implementation, the optical fibers 104, 106 and 108 may include Bragg reflectors 118, 120 and 122, respectively. As an example, the Bragg reflectors 118-122 may be formed in the longitudinal cores 110 of the optical fibers 104-108. In another implementation, the Bragg reflectors 118-122 may be formed with substantially uniform spacing around the waveguide bundle axes 114 of the optical fibers 104-108 at selected locations along the arrows 124, in the longitudinal cores 110 or in claddings 112 or both.

In addition to the optical fiber bundle 102, the Light Source Orientation Detector 100 may include optical detectors 126, 128 and 130. The optical detectors 126, 128 and 130 are in optical communication with the longitudinal cores 110 of the optical fibers 104, 106 and 108, respectively. In an implementation, the optical detectors 126-130 may be photo-detectors, such as semiconductor photodiodes as an example. In another implementation, one of the optical detectors 126, 128 and 130 may be in optical communication with the longitudinal cores of more than one of the optical fibers 104-108, and configured to generate and distinguish between light detection data from the optical fibers. The Light Source Orientation Detector 100 may further include a processor 132 configured to receive light detection data from the optical detectors 126, 128 and 130, and programmed to integrate such data into light source orientation information. As an implementation, the processor 132 may be adapted to communicate light source orientation information to an end-use system 134. In an example, the end-use system 134 may not be a part of the Light Source Orientation Detector 100. As another implementation, the end-use system 134 may constitute an integral part of the Light Source Orientation Detector 100.

In an example of operation of the Light Source Orientation Detector 100, the optical fiber bundle 102 may be located in a position selected to expose one or more of the Bragg reflectors 118, 120 and 122 to an external light source so that light source orientation information may be generated by the Light Source Orientation Detector 100. As an example, an external light source (not shown) may direct light at a selected wavelength or wavelength range in the general direction of one of arrows 136, 138 or 140 each intersecting with the waveguide bundle axis 114 from a different direction in the substantially transverse plane 142 defined by the arrows 144 and 146, toward the optical fiber bundle 102. As a further example, the optical fibers 104, 106 and 108 may intersect the substantially transverse plane 142 on lines 148, 150 and 152, respectively. In an implementation, each of the Bragg reflectors 118, 120 and 122 may be configured to constructively reflect light at the selected wavelength or wavelength range oriented in the substantially transverse plane 142 to couple into a propagating mode in the longitudinal cores 110 of the optical fibers 104, 106 and 108. As an example, the light may be so coupled in the longitudinal cores 110 in both directions as indicated by the arrow 154. Light that so propagates in any of the optical fibers 104, 106 and 108 to upper ends 156 of the optical fibers in the direction of the arrows 158 may then be detected by optical detectors 126, 128 and 130, respectively. The lower ends 160 of the optical fibers 104-108 may likewise be in optical communication with the optical detectors 126, 128 and 130 respectively or with other optical detectors (not shown). The optical detectors 126, 128 and 130 may output light detection data to the processor 132 for integration into light source orientation information. The processor 132 may then communicate the light source orientation information to the end-use system 134, configured to use the information.

Referring to FIG. 2, the waveguide bundle core 116 may in an implementation include a composition that absorbs or reflects and substantially does not transmit light at the wavelength or wavelength range selected for the Bragg reflectors 118, 120 and 122. The term "substantially does not transmit" as used throughout this specification means that more than 50% of light intensity at the selected wavelength or wavelength range directed onto a body of the composition is not transmitted through the composition body. As an example, the Bragg reflector 118 may receive light in the direction of the arrow 136, but the waveguide bundle core 116 may block reception by the Bragg reflector 118 of light in the directions of the arrows 138 and 140. In another implementation, the Bragg reflector 120 may receive light in the direction of the arrow 138, but the waveguide bundle core 116 may block reception by the Bragg reflector 120 of light in the directions of the arrows 136 and 140. As a further example, the Bragg reflector 122 may receive light in the direction of the arrow 140, but the waveguide bundle core 116 may block reception by the Bragg reflector 122 of light in the directions of the arrows 136 and 138. It is understood that optical detectors 126, 128 and 130 may be selected having sufficient optical sensitivity so that the Light Source Orientation Detector 100 may be functional even if the waveguide bundle core 116 is formed from a composition that transmits 50% or more of light intensity at the selected wavelength or wavelength range directed onto a body of the composition. It is likewise understood that including a composition that substantially does not transmit light at the selected wavelength or wavelength range in the waveguide bundle core 116 may facilitate increased accuracy in determining light source orientation information.

The Bragg reflectors 118, 120 and 122 in the optical fiber bundle 102 may receive light in the directions of the arrows 136, 138 and 140 respectively, and reflect such received light to be coupled in propagating modes in the directions of the arrow 154 through the longitudinal cores 110 of the optical fibers 104, 106 and 108, respectively. Each of the arrows 136, 138 and 140 lies in the substantially transverse plane 142 defined by the arrows 144 and 146, both of which may be perpendicular to the arrow 154 and the waveguide bundle axis 114. The arrows 144, 146 and 154 may be considered to constitute x-, y- and z-axes for three-dimensional coordinates of light source orientation information. Light detection data generated by the optical detectors 126, 128 and 130 may, as an example, be effective to determine x- and y-axis light source orientation information regarding a light source that is oriented at a direction within the substantially transverse plane 142. However, light from a source that is not oriented at a direction within the substantially transverse plane 142 may not be reflected by the Bragg reflectors 118-122 into propagating modes in the longitudinal cores 110 of the optical fibers 104-108. Hence, the Light Source Orientation Detector 100 may not be effective to generate z-axis light source orientation information regarding a light source that is not oriented within the substantially transverse plane 142. In an example, a second optical fiber bundle (not shown) having a waveguide bundle axis 162 oriented in a direction that is not parallel to the waveguide bundle axis 114 and that is in optical communication with additional optical detectors (not shown) may be included in the Light Source Orientation Detector 100. The non-parallel alignment of the first optical fiber bundle 102 on the waveguide bundle axis 114 with the second optical fiber bundle (not shown) on the waveguide bundle axis 162 may enable the Light Source Orientation Detector 100 to determine three-dimensional x-, y- and z-axis light source orientation information regarding a light source emitting light from any orientation towards the optical fiber bundles.

In an implementation, the Bragg reflectors 118-122 may be Bragg gratings within the structure of the optical fibers 104, 106 and 108. The Bragg reflectors 118-122 in the form of Bragg gratings may be located around the longitudinal axes 114 of the optical fibers 104-108 within in the longitudinal core 110 or in the cladding 112 or both. As an example, a Bragg grating may include a stack of parallel and periodically spaced disk-shaped regions within the optical fiber structure having a higher refractive index than that of immediately surrounding regions of the structure. Referring to the Bragg reflector 120 as an example, the stack may in an implementation be oriented with each of the disk-shaped regions substantially transverse to a longitudinal axis 164 of the optical fibers 104, 106 and 108. In an implementation, the periodic spacing distance may be substantially uniform. The refractive index variations may scatter and selectively reflect light passing through the grating by the Bragg effect. Light having a selected wavelength that is equal to or a multiple of the periodic spacing distance "n" then may be scattered in phase so that the light waves constructively interfere and are reflected. As examples, the selected wavelength may be substantially equivalent to a multiple of the periodic spacing distance selected from 1n, 2n, 3n . . . etc. The orientation of the disk-shaped regions may be selected so that light at the selected wavelength entering the Bragg reflector 120 in the direction of the arrow 136 may be reflected to propagate in the longitudinal core 110 of the optical fiber 106 in the directions of the arrow 154. The strength of this reflection may be influenced by, as examples, the uniformity of the periodic spacing distance, the number of disk-shaped regions in the stack, and the difference between the refractive index of the disk-shaped regions compared with that of the surrounding regions of the structure. A Bragg grating having a relatively uniform periodic spacing distance, relatively uniform disk-shaped region dimensions, and relatively more disk-shaped regions in the stack may constructively reflect light at a relatively greater intensity, at a selected wavelength equal to the distance between the disk-shaped regions. Further, a Bragg grating having a relatively greater difference between the refractive index of the disk-shaped regions compared with that of the surrounding regions of the structure may constructively reflect light at a relatively greater intensity.

As an example, the periodic spacing distance in the Bragg reflector 120 may not be completely uniform. In this example, light at a wavelength within a band of wavelengths that enters the Bragg reflector 120 in the direction of the arrow 136 may constructively interfere and be reflected to propagate in the longitudinal core 110 of the optical fiber 106 in the directions of the arrow 154. In an implementation, a wavelength band may be selected to so propagate in the longitudinal core 110 of the optical fiber 106 by forming a Bragg reflector 120 having a stack of disk-shaped regions periodically spaced at a range of distances equal to the corresponding range of wavelengths. As an example, such a Bragg reflector 120 may have a selected wavelength of peak reflection intensity within a reflection wavelength range of progressively decreasing reflection intensity at wavelengths in the range above and below the selected wavelength. In an implementation, the Bragg reflector 120 may have a detectable reflection intensity over a narrow range of wavelengths spanning about 0.5 nanometers or less. As another example, the Bragg reflector 120 may have a detectable reflection intensity over a broad range of wavelengths spanning up to about 3 nanometers.

In an implementation, a wavelength band may be selected for the Bragg reflector 120 by forming the Bragg reflector having a stack of disk-shaped regions periodically spaced at a range of distances equal to a corresponding range of wavelengths to be detected. As an example, a light source may be selected as to which light source orientation information is to be determined. An operating wavelength range of the light source may be identified, and a Bragg reflector may then be formed having a stack of disk-shaped regions periodically spaced at a range of distances equal to the operating wavelength range of the light source. In an implementation, the light source may be a laser light source operating within a laser wavelength or laser wavelength band. Such a laser light source may as examples be utilized to mark targets for delivery of launched weapons, or may be utilized to transmit optical communication signals. A Light Source Orientation Detector 100 including a Bragg reflector 120 may detect light at the selected wavelength or wavelength range received in the direction of the arrow 136. In an implementation, background light such as sunlight, moonlight, or light from another light source such as a street lamp, flashlight or room lighting may not be detected by the Light Source Orientation Detector 100 because those light sources may not direct a detectable intensity of light at the selected wavelength or wavelength range in the direction of the arrow 136.

As another example, the Light Source Orientation Detector may include a second optical fiber bundle oriented on an axis that is not parallel to the waveguide bundle axis 114. Bragg reflectors 118, 120 and 122 may each include a stack of disk-shaped regions periodically spaced at the same selected distance or the same selected range of distances. In this example, light at the same wavelength or within the same range of wavelengths that enters the Bragg reflectors 118, 120 and 122 in the directions of the arrows 136, 138 and 140, respectively, may constructively interfere and be reflected to propagate in the longitudinal cores 110 of the optical fibers 104, 106 and 108 respectively in the directions of the arrow 154. As a further implementation, the Bragg reflectors (not shown) in a second optical fiber bundle (not shown) oriented on the waveguide bundle axis 162 may likewise each include a stack of disk-shaped regions periodically spaced at the same selected distance or the same selected range of distances. In this implementation, light at the selected wavelength or within the selected range of wavelengths may also enter the Bragg reflectors of the second optical fiber bundle, so that three-dimensional light source orientation information in the directions of the arrows 144, 146 and 154 may be generated by the Light Source Orientation Detector 100.

As a further example, one or more of the optical fibers 104, 106 and 108 may include a plurality (not shown) of Bragg reflectors spaced apart at one or more selected intermittent distances from each other in the directions of the waveguide bundle axis 114, each of the plurality of Bragg reflectors in any one of the optical fibers including a stack of disk-shaped regions periodically spaced at the same selected distance or the same selected range of distances. As a result, each of the plurality of Bragg reflectors propagates light at the same wavelength or within the same wavelength range in the longitudinal cores 110 of the optical fibers 104, 106 and 108 in the directions of the arrow 154. Without this propagation wavelength uniformity, the Bragg reflectors in an optical fiber 104, 106 or 108 may block transmission of light propagated by each other. An optical fiber 104, 106 or 108 including a plurality of Bragg reflectors having propagation wavelength uniformity in this manner may communicate more intense light to the optical detectors 126, 128 and 130, respectively than may be communicated by any one of the Bragg reflectors. Further, light from a source that is oriented within one or more planes (not shown) parallel with the substantially transverse plane 142 may enter and be propagated in one of the spaced apart plurality of Bragg reflectors in one or more of the optical fibers 104, 106 and 108. Additionally, formation of a plurality of Bragg reflectors spaced apart from each other at a selected distance on an optical fiber 104, 106 or 108 to effectively form an intermittent Bragg reflector may require fewer resources than formation of a single Bragg reflector spanning the overall distance along the waveguide bundle axis 114 between all of the plurality of Bragg reflectors. The selected distance is at least equivalent to a selected wavelength of light to be detected. In another implementation, the plurality of Bragg reflectors on an optical fiber 104, 106 or 108 may span a maximal distance along the longitudinal core 110 to increase the distance over the y-axis indicated by the arrow 154 over which the Light Source Orientation Detector 100 may determine light source orientation information.

In another implementation, the Light Source Orientation Detector 100 may include two additional optical fiber bundles (not shown) having waveguide bundle axes oriented in two different directions in the same manner as explained above regarding the waveguide bundle axes 114 and 162, these two additional optical fiber bundles each having Bragg reflectors that include a stack of disk-shaped regions periodically spaced at a second selected distance or a second selected range of distances. In this implementation, the Light Source Orientation Detector 100 may generate light source orientation information regarding light sources having two different wavelengths or having two different wavelength ranges.

In an implementation, the Light Source Orientation Detector 100 may include a Bragg reflector 120 in the form of a blazed Bragg grating. As an example, a Bragg reflector 120 in the form of a blazed Bragg grating may be selected so that light at a selected wavelength or selected wavelength range may constructively interfere in the grating and propagate in the longitudinal core 110 of the optical fiber 106 in the directions of the arrow 154, from a light source that is not oriented in the substantially transverse plane 142. In an implementation, the Light Source Orientation Detector 100 may also include Bragg reflectors 118 and 122 in the form of blazed Bragg gratings. As another example, a blazed Bragg grating may be selected and included in an optical fiber bundle (not shown) having a waveguide bundle axis 162, such that light at a selected wavelength or selected wavelength range may enter the blazed Bragg grating in the substantially transverse plane 142, constructively interfere and be reflected to propagate in the longitudinal core of an optical fiber (not shown) of the optical fiber bundle in the directions of the waveguide bundle axis 162. In an implementation, the Bragg reflector 120 in the form of a blazed Bragg grating may, as in an unblazed grating, include a stack of parallel and periodically spaced disk-shaped regions within the optical fiber structure having a higher refractive index than that of immediately surrounding regions of the structure. Additionally in this implementation, each of the disk-shaped regions may include a planar surface that is not oriented perpendicular to the waveguide bundle axis.

As a further example, the Bragg reflector 120 may include a stack of parallel and periodically spaced disk-shaped regions within the optical fiber structure having a higher refractive index than that of immediately surrounding regions of the structure. A relatively smaller contrast between the refractive indices of the disk-shaped regions and the surrounding regions results in a relatively larger wavelength band in the Bragg reflector 120. In another implementation, the Bragg reflector 120 may be any type of wavelength tunable grating that may be embedded, etched, imprinted, or otherwise formed in the optical fiber 106.

In an implementation, the optical fibers 104, 106 and 108 may be any type of optical fibers including a longitudinal core 110 and capable of propagating light in the directions of the arrow 154 through the longitudinal cores. As examples, single-mode or multi-mode optical fibers may be utilized. In another implementation, the optical fibers 104, 106 and 108 may be formed of inorganic or organic compositions, or both. As an example, the optical fibers 104, 106 and 108 may be formed of silicon-dioxide based compositions suitably doped to define a refractive index gradient between the longitudinal core 110 surrounded by a cladding 112. In another example, the cladding may be omitted. In another implementation, the optical fibers 104, 106 and 108 may be formed of polymeric compositions defining such a refractive index gradient.

In an implementation, the optical fibers 104, 106 and 108 may be selected to include longitudinal cores 110 having relatively large diameters in the directions of the arrows 136, 138 and 140. As an example, such optical fibers 104, 106 and 108 may propagate light in the directions of the arrow 154 at relatively high intensities. As an implementation, optical fibers 104, 106 and 108 having overall diameters within a range of between about 125 micrometers and about 0.3 millimeters in the directions of the arrows 136, 138 and 140 may be utilized. Although the longitudinal core 110 and cladding 112 of the optical fibers 104, 106 and 108 are shown in FIG. 2 with circular cross-sections, it is understood that optical fibers having other cross-sectional shapes may be utilized. In an example (not shown), the optical fibers 104, 106 and 108 may have "D" shaped cross-sections.

FIG. 1 shows an optical fiber bundle 102 including three optical fibers 104, 106 and 108. It is understood (not shown) that the optical fiber bundle 102 may include more or less than three optical fibers. As examples, the optical fiber bundle 102 may include two, four, five or six optical fibers. In implementations where the optical fiber bundle 102 includes three optical fibers 104, 106 and 108, the optical fibers may be oriented at radial angles of about one hundred and twenty degrees (120°) around the waveguide bundle axis 114, as shown by the arrow 166. As another example (not shown), five optical fibers may be mutually oriented at radial angles of about 72° around the waveguide bundle axis 114. As an example, the Light Source Orientation Detector 100 may include three optical fiber bundles, respectively including optical fibers 104 and 106, optical fibers 106 and 108, and optical fibers 104 and 108. Light detection data collectively generated by the three optical fiber bundles may be communicated to the optical detectors 126-130 and integrated by the processor 132 into light source orientation information.

The waveguide bundle core 116 may include a bundle core composition that absorbs light at a selected wavelength or selected wavelength range for the Bragg reflectors 118-122. In this implementation, as discussed above, light from an external source may accordingly be constrained to reach each of the Bragg reflectors 118-122 only from a restricted range of different directions substantially transverse to the waveguide bundle axis 114. As an example, the bundle core composition may include a dye that absorbs light at the selected wavelength or selected wavelength range, dispersed in a polymerizable material. In an implementation, the polymerizable material may be a glue composition. As a further example, the polymerizable material may form a waveguide bundle core 116 having a selected stiffness and flexibility regarding displacement of the optical fiber bundle 102 along the waveguide bundle axis 114, in the directions of the arrows 136, 138 and 140.

In an implementation, the optical detectors 126-130 may be photodetectors configured to receive light emitted from upper and lower ends 156 and 160 respectively of the optical fibers 104-108, and to analyze the light. As an example, the optical detectors 126-130 may be configured to measure the intensity of light emitted from upper and lower ends 156 and 160 of the optical fibers 104-108 and to output the intensity measurements as light detection data. In an implementation, the optical detectors 126-130 may be semiconductor photodiodes. As an example, the optical detectors 126-130 may convert light intensity measurements into electronic light detection data.

In an implementation, the processor 132 may be configured to receive light detection data from the optical detectors 126-130. In an example, the processor 132 may use the light detection data to compare the intensity of light received from the optical fibers 104, 106 and 108, respectively. The processor 132 may, as an example, be configured to also obtain Bragg reflector orientation data regarding the orientations of the Bragg reflectors 118-122 with respect to the arrows 144, 146 and 154. The processor 132 may further, as an example, be configured to obtain Bragg reflector orientation data regarding the orientation of the optical fiber bundle 102 on the waveguide bundle axis 114 with respect to any additional optical fiber bundles on other waveguide bundle axes such as on waveguide bundle axis 162. The processor 132 may additionally be configured to combine the light detection data and Bragg reflector orientation data in calculating light source orientation information. As another example, the processor 132 may be configured to receive satellite positioning system ("SPS") data such as global positioning satellite data regarding the location of the Light Source Orientation Detector 100, and to include such data in calculating light source orientation data. It is understood that the processor 132 may form an integral part of the Light Source Orientation Detector 100, or may be separately located. It is further understood that an end-use system 134 may be integrated with the Light Source Orientation Detector 100, or may be separately located. As an example, the end-use system 134 may be configured to use the light source orientation information to control offensive and defensive weaponry.

FIG. 3 is a perspective view showing an optical fiber 300, having a Bragg reflector in the form of a prism row 302, which may be included in an optical fiber bundle. FIG. 4 is a cross-sectional view taken on line 4-4 showing the optical fiber 300 of FIG. 3. The optical fiber 300 may include a longitudinal core 304. In an implementation, the longitudinal core 304 may be surrounded by a cladding 306. As an example, the prism row may include a row of parallel prisms 308, 310, 312, 314, 316 and 318 configured to refract light at a selected wavelength or within a selected wavelength range to propagate through the longitudinal core 304 in the directions of the longitudinal axis 320 of the optical fiber 300. As an example, the prisms 308-318 may include surfaces oriented at angles of 45 degrees with respect to the longitudinal axis 320. The row may in an implementation be oriented as shown in FIG. 3 with each of the prisms positioned substantially transverse to the longitudinal axis 320. The prisms 308-318 may, as an example, be located on the longitudinal exterior 322 of the optical fiber 300. In an implementation, the prisms 308-318 may be separated by a substantially uniform spacing distance. Light having a selected wavelength or within a selected wavelength range may be refracted in phase through the prisms 308-318 so that the light waves constructively interfere and are reflected. The orientations of the prisms may be selected so that light at the selected wavelength or within the selected wavelength range entering the prism row 302 in the direction of the arrow 324 may be reflected to propagate in the longitudinal core 304 of the optical fiber 300 in the directions of the longitudinal axis 320. In an implementation, the optical fiber 300 may be substituted for one or more of the optical fibers 104, 106 and 108 discussed above and shown in FIGS. 1 and 2. It is understood that the number of prisms included in the prism row 302 may be varied. It is understood that the prism rows may be substituted by another type of periodic array that allows both selective optical reflections and transmission of reflected light through the array to propagate in the longitudinal core 304 of the optical fiber 300. As an example, a photonic crystal may be utilized. As a further implementation, the Light Source Orientation Detector 100 may include optical waveguides (not shown) each having one or more Bragg reflectors in the form of gratings, prism rows, combinations of gratings and prism rows, or other structures including surfaces that may selectively reflect, refract or scatter light into a propagating mode in an optical waveguide core.

FIG. 5 is a perspective view showing a planar waveguide bundle 500 that may be included in the Light Source Orientation Detector 100. FIG. 6 is a cross-sectional view taken on line 6-6 showing the planar waveguide bundle 500 of FIG. 5. In an implementation, the planar waveguide bundle 500 may be substituted in the Light Source Orientation Detector 100 for the optical fiber bundle 102 and for any additional optical fiber bundles such as the optical fiber bundle (not shown) oriented on the waveguide bundle axis 162. The term "optical waveguide" used throughout this specification includes optical fibers, planar waveguides, and any other structures employing refraction index gradients to form a waveguide for transmission of light. The term "optical waveguide bundle" used throughout this specification includes optical fiber bundles, planar waveguide bundles, and bundles formed with any other such structures.

The planar waveguide bundle 500 may, as an example, include four planar waveguides 502, 504, 506 and 508. In an implementation, each of the planar waveguides 502-508 may include a longitudinal core 510. As an example, the longitudinal core 510 may be surrounded by a cladding 512. The planar waveguides 502-508 may be spaced apart and substantially aligned along around a waveguide bundle axis 514. As an example, a waveguide bundle core 516 (shown in FIG. 6 but omitted from FIG. 5) may be interposed between the planar waveguides 502-508, holding the planar waveguides in such spaced apart alignment.

In an implementation, the planar waveguides 502, 504, 506 and 508 may include Bragg reflectors 518, 520, 522 and 524, respectively. As an example, the Bragg reflectors 518-524 may be formed in the longitudinal cores 510 of the planar waveguides 502-508. As a further example, each of the Bragg reflectors 518, 520, 522 and 524 may include a stack of parallel and periodically spaced disk-shaped regions within the planar waveguide structure having a higher refractive index than that of immediately surrounding regions of the structure. In another implementation, the Bragg reflectors 518-524 may be formed at selected locations in the longitudinal cores 510 or in the claddings 512 or both at selected positions along the arrows 526. Referring to FIG. 6, the waveguide bundle core 516 may in an implementation include a composition that absorbs light at the wavelength or wavelength range selected for the Bragg reflectors 518-524.

As an implementation, the longitudinal cores of the planar waveguides 502, 504, 506 and 508 may be in optical communication with the optical detectors 126, 128, 130, and an additional optical detector (not shown), respectively, in the same manner as discussed in connection with FIGS. 1 and 2. The optical detectors 126, 128, 130, and the additional optical detector (not shown), may as an example be in communication with the processor 132 in the same manner as discussed above in connection with FIGS. 1 and 2.

In an example of operation of the Light Source Orientation Detector 100 including the planar waveguide bundle 500, the planar waveguide bundle may be located in a position selected to expose one or more of the Bragg reflectors 518-524 to an external light source so that light source orientation information may be generated by the Light Source Orientation Detector 100. As an example, an external light source (not shown) may direct light at a selected wavelength or wavelength range in the general direction of the arrow 528 in the substantially transverse plane 142 defined by the arrows 530 and 532, toward the planar waveguide bundle 500. In an implementation, each of the Bragg reflectors 518-524 may be configured to constructively reflect light at the selected wavelength or wavelength range oriented in the substantially transverse plane 142 to couple into a propagating mode in the longitudinal cores 510 of the planar waveguides 502-508. As an example, the light may be so coupled in the longitudinal cores 510 in both directions of the waveguide bundle axis 514. The lower ends of the planar waveguides 502-508 may likewise be in optical communication with the optical detectors 126, 128, 130 and the additional optical detector (not shown) respectively, or with other optical detectors (not shown).

In an implementation, the Bragg reflectors 518-524 may be Bragg gratings within the structure of the planar waveguides 502, 504, 506 and 508. The Bragg reflectors 518-524 in the form of Bragg gratings may be located within the planar waveguides 502-508 in the longitudinal core 510 or in the cladding 512 or both. The above discussion in connection with FIGS. 1 and 2 of implementations regarding the structure, orientation, periodic spacing distance, wavelength selectivity, strength, inclusion of Bragg gratings on additional planar waveguide bundles oriented in the same or different directions than the planar waveguide bundle 500, inclusion of intermittent Bragg gratings, inclusion of blazed gratings, and other contemplated variations in the selection and operation Bragg reflectors 118-122 as discussed above are also fully applicable to the Bragg reflectors 518-524.

As a further example, the Bragg reflector 518 may include a stack of parallel and periodically spaced disk-shaped regions within the planar waveguide structure having a higher refractive index than that of immediately surrounding regions of the structure. A relatively smaller contrast between the refractive indices of the disk-shaped regions and the surrounding regions results in a relatively larger wavelength band in the Bragg reflector 518. In another implementation, the Bragg reflector 518 may be any type of wavelength tunable grating that may be embedded, etched, imprinted, or otherwise formed in the planar waveguide 502.

In an implementation, the planar waveguides 502-508 may be any type of planar waveguides including a longitudinal core 510 and capable of propagating light in the directions of the waveguide bundle axis 514 through the longitudinal cores. As examples, the planar waveguides 502-508 may be formed of inorganic or organic compositions, or both. As an example, the planar waveguides 502-508 may be formed of silicon-dioxide based compositions suitably doped to define a refractive index gradient between the longitudinal core 510 surrounded by a cladding 512. In another implementation, the planar waveguides 502-508 may be formed of polymeric compositions defining such a refractive index gradient. In an implementation, the planar waveguides 502-508 may be selected to include longitudinal cores 510 having a relatively large cross-sectional area taken on the line 6-6.

FIG. 5 shows a planar waveguide bundle 500 including four planar waveguides 502, 504, 506 and 508. It is understood (not shown) that the planar waveguide bundle 500 may include more or less than four planar waveguides. As examples, the planar waveguide bundle 500 may include two, three, five or six planar waveguides. In implementations where the planar waveguide bundle 500 includes four planar waveguides 502, 504, 506 and 508, the planar waveguides may be mutually oriented at radial angles of about 90° around the waveguide bundle axis 514.

The waveguide bundle core 516 may include a bundle core composition that absorbs light at a selected wavelength or selected wavelength range for the Bragg reflectors 518-524, in the same manner as discussed above with regard to the optical fiber bundle 102.

Figure 7:
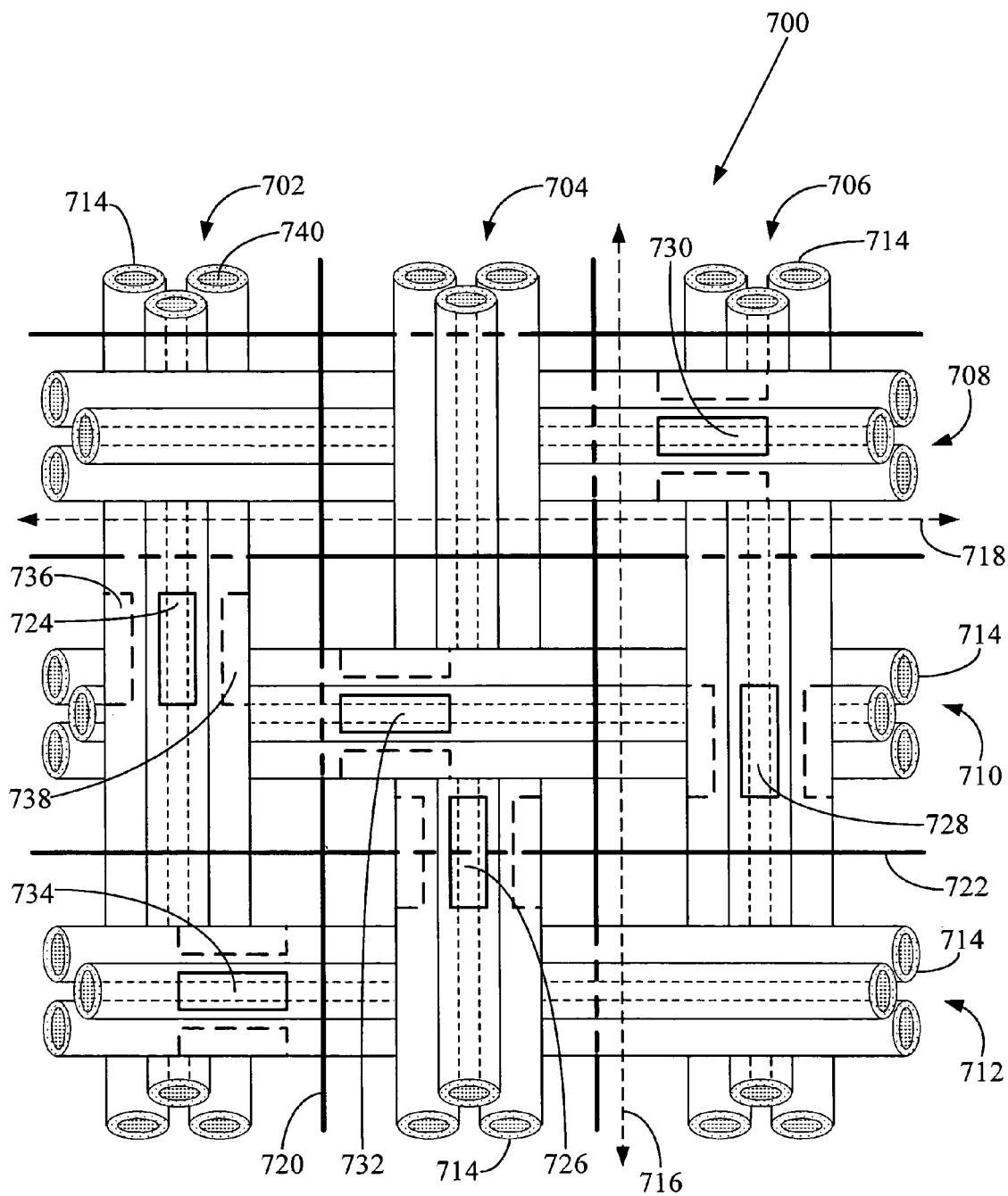
FIG. 7 is a top view showing a portion of an optical waveguide bundle grid that may be included in the Light Source Orientation Detector shown in FIG. 1.

FIG. 7 is a top view showing a portion of an implementation of an optical waveguide bundle grid 700 that may be included in the Light Source Orientation Detector 100 shown in FIG. 1. As an example, the optical waveguide bundle grid 700 may include optical fiber bundles 702, 704, 706, 708, 710 and 712. In an implementation, each of the optical fiber bundles 702-712 may have a structure similar to that of the optical fiber bundle 102 discussed earlier, may each include a waveguide bundle core (not shown) similar to the waveguide bundle core 116 discussed earlier, and may each be in communication with an optical detector (not shown) and a processor (not shown) in the same manner as discussed above in connection with the optical fiber bundle 102 of the Light Source Orientation Detector 100. It is understood that a planar waveguide bundle or another type of optical waveguide bundle may be substituted for any or all of the optical fiber bundles 702-712 in the same manner as discussed above in connection with FIGS. 5 and 6.

As an example, each of the optical fiber bundles 702, 704 and 706 may include a plurality of optical fibers 714 oriented generally in the directions of the arrow 716; and each of the optical fiber bundles 708, 710 and 712 may include a plurality of optical fibers 714 oriented generally in the directions of the arrow 718. In an implementation, the arrows 716 and 718 may be orthogonal, defining a grid plane. As an example, the optical fiber bundles 702-706 may be interwoven with the optical fiber bundles 708-712 as shown in FIG. 7 to form the optical waveguide bundle grid 700. In a further example, the optical waveguide bundle grid 700 may include additional optical fiber bundles (not shown) each oriented generally in the directions of either the arrow 716 or the arrow 718, or oriented in other directions in the grid plane. In an implementation, the optical waveguide bundle grid 700 may itself be interwoven with textile fibers 720 oriented generally in the directions of the arrow 716, and textile fibers 722 oriented generally in the directions of the arrow 718. As an example, the textile fibers 720 and 722 may form a fabric. In another implementation, the textile fibers 720 and 722 may be any type of textile fibers suitable for forming a fabric, such as natural or synthetic textile fibers. The term "textile fiber" as used throughout this specification means any fiber, filament, yarn or the like that is suitable for forming any type of fabric. As an example, textile fibers 720 and 722 having flexibility and durability suitable for a designated end-use application for the optical waveguide bundle grid 700 may be selected.

In an implementation, the optical waveguide bundle grid 700 may be interwoven with textile fibers 720 and 722 to form a fabric suitable for inclusion in an outer jacket or other garment to be worn by a soldier, law enforcement officer, or other human or animal weaponry target. As an example, the optical fiber bundles 702-712 may be placed in communication with optical detectors (not shown) in the same manner as discussed with regard to the optical fiber bundle 102 and shown in FIGS. 1-4. In an implementation, the optical detectors (not shown) may be configured to measure the intensity of light emitted from ends of the optical fibers 714 and to output the intensity measurements as light detection data. As an example, the optical detectors may convert light intensity measurements into electronic light detection data. In an implementation, the optical waveguide bundle grid 700 in the jacket or other garment so integrated with optical detectors and a processor (not shown), may detect laser light that is directed onto the optical waveguide bundle grid 700 from an external light source. As an example, the external light source may be a laser guidance system for painting a target with laser light that then guides weaponry such as bullets to strike the target. In the same manner as discussed above with regard to the Light Source Orientation Detector 100, the optical waveguide bundle grid 700 may determine light source orientation information concerning the external light source. A processor (not shown) integrated with the optical waveguide bundle grid 700 in the same manner as discussed with respect to the Light Source Orientation Detector 100 may, as an example, communicate the light source orientation information to an end-use system (not shown). In an implementation, the end-use system may be configured to defend the soldier, law enforcement officer, or other potential weaponry target from laser-targeted weaponry. As another example, the end-use system may be configured to control weaponry in order to attack the laser light source and any personnel that are operating the laser light source.

As an example, the optical fiber bundles 702, 704, 706, 708, 710 and 712 may respectively include Bragg reflectors 724, 726, 728, 730, 732 and 734. As an example, the optical fiber bundle 702 including the Bragg reflector 724 may be substituted for the optical fiber bundle 102 and Bragg reflector 120 discussed above in connection with FIGS. 1-4. As an example, a waveguide bundle core such as the waveguide bundle core 116 shown in FIG. 2 may be interposed between the optical fibers 714 holding the optical fibers of each of the optical fiber bundles 702-712 in spaced apart alignment. As an example, the optical fiber bundle 702 may also include Bragg reflectors 736 and 738, respectively substituted for the Bragg reflectors 118 and 122 discussed above in connection with FIGS. 1-4. In an implementation, the optical fiber bundles 704, 706, 708, 710 and 712 may also include Bragg reflectors in addition to the Bragg reflectors 726, 728, 730, 732 and 734 respectively, in an analogous manner.

The above discussions of the optical fiber bundle 102 in connection with FIGS. 1-6 regarding implementations of the structure, orientation, composition, inclusion of Bragg reflectors, inclusion of Bragg reflectors on additional optical fiber bundles oriented in the same or different directions, and other contemplated variations in the structure and operation of the optical fiber bundle 102 discussed above, are also fully applicable to the optical waveguide bundle grid 700. Furthermore, the above discussions of the Bragg reflectors 118-122 in connection with FIGS. 1-6 regarding implementations of structure, orientation, periodic spacing distance, wavelength selectivity, strength, inclusion of Bragg gratings, inclusion of intermittent Bragg gratings, inclusion of blazed gratings, and other contemplated variations in the selection and operation of the Bragg reflectors 118-122 discussed above are also fully applicable to the optical waveguide bundle grid 700.

Figure 8:
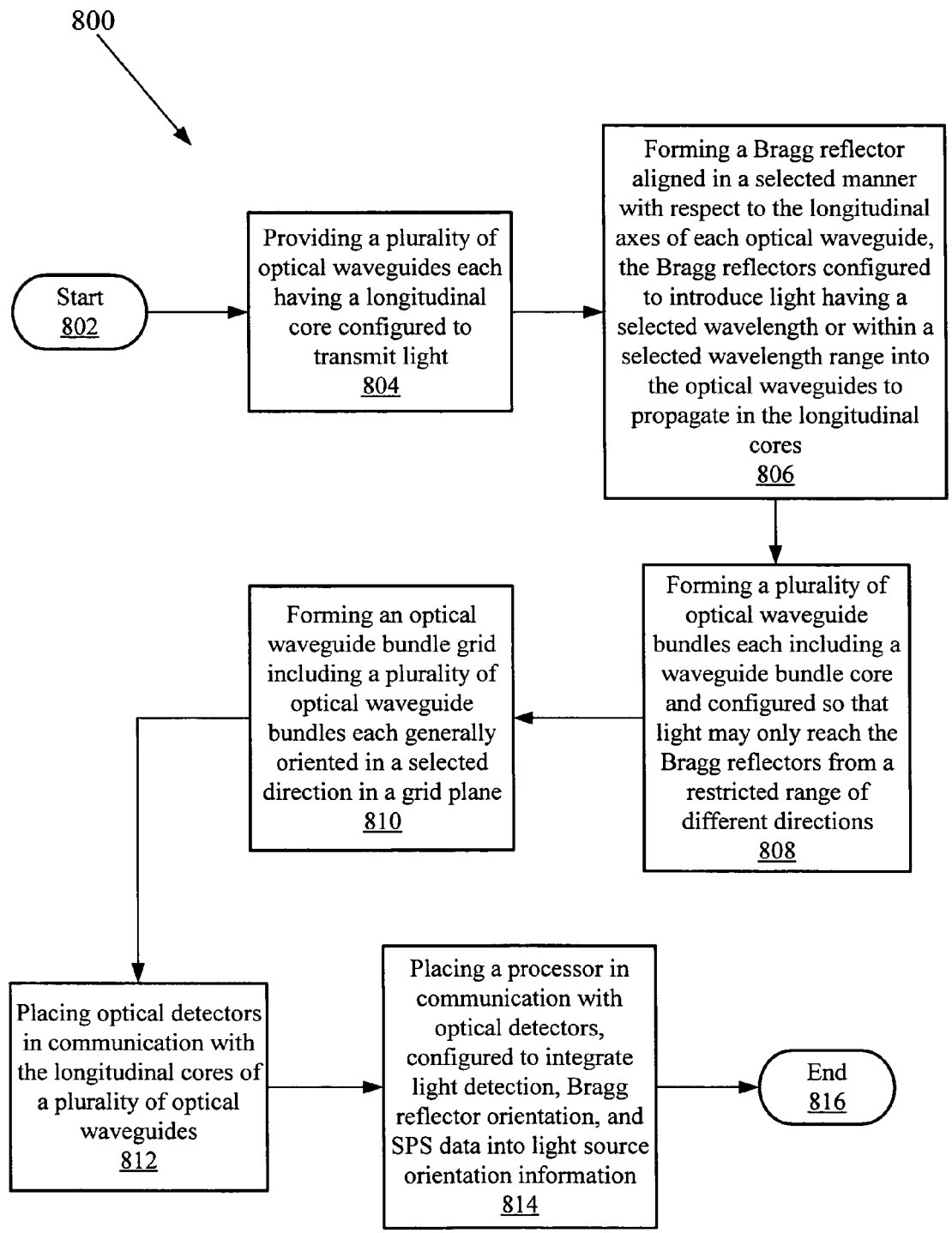
FIG. 8 is a flowchart of a process for making an implementation of the Light Source Orientation Detector of FIG. 1 including the optical waveguide bundle grid of FIG. 7.

FIG. 8 is a flowchart of a process for forming an implementation of the Light Source Orientation Detector 100 of FIG. 1 including the optical waveguide bundle grid 700 of FIG. 7. The process starts at step 802, and then at step 804 a plurality of optical waveguides such as optical fibers 714 may be formed or provided, each having a longitudinal core 740 configured to transmit light. In the discussion below, the optical fiber bundles 102 and 702 shown in FIGS. 1 and 7 are respectively considered to be equivalent and are interchangeably discussed. As an example, optical fibers similar to the optical fibers 104, 106 and 108 of the optical fiber bundle 102 shown in FIGS. 1 and 2 may be formed or provided. It is understood that a prism bar may be formed on some or all of the optical fibers 714 as discussed above in connection with FIGS. 3 and 4 instead of Bragg reflectors such as Bragg reflectors 724-734. It is further understood that other types of optical waveguides, such as the planar waveguides 502-508 discussed above in connection with FIGS. 5 and 6, may be substituted for some or all of the optical fibers 714.

At step 806, Bragg reflectors 724-734 may be formed in the optical fibers 714. As an example, Bragg reflectors may be formed that are similar to the Bragg reflectors 118, 120 and 122 in optical fiber bundle 102, formed as discussed above in the optical fibers 104, 106 and 108, respectively. The Bragg reflectors 118-122 may as an example be aligned in a selected manner with respect to longitudinal axes 164 of each of the optical fibers 104-108, the Bragg reflectors configured to introduce light having a selected wavelength or within a selected wavelength range into the optical fibers to propagate in the longitudinal cores 110.

In an implementation, a wavelength selected for the Bragg reflectors 118-122 may take into account the refractive index of the composition from which the optical fibers 104-108 are formed. As an example, a Bragg reflector may be formed in germanium-doped silicon dioxide (Ge-doped silica) by selectively breaking atomic bonds in the Ge-doped silica. In an implementation, the Ge-doped silica may be illuminated by ultraviolet light through a thin, flat slab of silicon with openings patterned to constitute a phase mask. As an example, a pulsed ultraviolet laser may illuminate Ge-doped silica optical fibers such as optical fibers 104-108 through such a phase mask for several minutes at a high intensity. The refractive index of regions of the optical fibers 104-108 that are so exposed to the ultraviolet light may be caused to differentially increase relative to the adjacent unexposed regions. The exposed regions may correspond to a selected three-dimensional grating of disks in the Ge-doped silica having a differentially increased refractive index. As another example, pretreatment of the optical fibers 104-108 by exposure to hydrogen prior to illumination by the phase masked ultraviolet laser may result in a patterned differential refractive index increase of up to about 1%.

The phase mask spacing may be selected to be about the same distance as the selected wavelength for the Bragg reflectors 118-122. As an additional example, the phase mask spacing may be selected to vary over a range that is about the same as a selected wavelength range for the Bragg reflectors 118-122. In another implementation, calculation of the phase mask spacing to be used may take into account the refractive index of the Ge-doped silica. The wavelength in air of the light reflected by the Bragg reflectors 118-122 approximately equals n times D, where n=the refractive index of the Ge-doped silica, and D=the periodic spacing distance between the disks that have a differentially increased refractive index within the Bragg reflectors. As an example, if the periodic spacing distance=0.5 micrometer and the refractive index of the germanium-doped silica=1.47, then the selected wavelength of light traveling in air=0.5 micron times 1.47=0.735 micron. Hence, once a wavelength of light in air has been selected for detection by the Light Source Orientation Detector 100, the corresponding periodic spacing distance and the corresponding phase mask spacing may be calculated. In another implementation, calculation of the phase mask spacing to be used may take into account the temperature conditions of the environment where the Light Source Orientation Detector 100 will be utilized, as the temperature of the Bragg reflectors affects the refractive index of light within them.

At step 808, a plurality of optical waveguide bundles that may be in the form of optical fiber bundles 702-712 may be formed, as an example each having a structure similar to that of the optical fiber bundle 102. In an implementation, the optical fiber bundle 702 may as an example include a waveguide bundle core (not shown), and light from an external source may be constrained to reach each of the Bragg reflectors 736, 724 and 738 only from a restricted range of different directions substantially transverse to the waveguide bundle core in the same manner as discussed above with respect to Bragg reflectors 118-122 shown in FIG. 2. The optical fiber bundles 704-712 may likewise include Bragg reflectors (not shown) configured so that light from an external source may be constrained to reach each of the Bragg reflectors only from a restricted range of different directions substantially transverse to the waveguide bundle cores. As an example, optical detectors (not shown) may then be configured to qualitatively measure the presence or absence of light emitted from ends of the optical fibers 714 and to output the resulting on-off data as light detection data. A processor may then integrate Bragg reflector orientation information together with the on-off data to generate light source orientation information.

In an implementation, forming each of the optical fiber bundles 702-712 may include orienting the optical fibers 714 substantially aligned along and around a waveguide bundle axis (not shown) while forming and solidifying a waveguide bundle core (not shown) to yield a structure similar to that of the optical fiber bundle 102 shown in FIG. 2.

At step 810, an optical waveguide bundle grid 700 may be formed, including a plurality of optical waveguide bundles such as optical fiber bundles 702-712 each being generally oriented in a selected direction in a grid plane defined, as an example, by the arrows 716 and 718. In an implementation, formation of the optical waveguide bundle grid 700 may include interweaving the optical fiber bundles such as optical fiber bundles 702-712 together with textile fibers such as textile fibers 720 and 722. In another example, either a preformed fabric including textile fibers 720 and 722 may be provided and optical fiber bundles such as optical fiber bundles 702-712 may be woven into the fabric, or the textile fibers 720 and 722 may be woven into a pre-formed optical waveguide bundle grid 700.

At step 812, optical detectors such as optical detectors 126-130 may be placed in communication with longitudinal cores 740 of a plurality of optical fibers 714 of the optical waveguide bundle grid 700 in the same manner as discussed above in connection with FIG. 1. At step 814, a processor may be placed in communication with optical detectors such as optical detectors 126-130 in the same manner as discussed above in connection with FIG. 1, and configured to integrate light detection data into light source orientation information. In another implementation, the processor may also receive and integrate Bragg reflector orientation data. As a further example, the processor may additionally receive and integrate satellite positioning system data. The process may then end at step 816.

Figure 9:
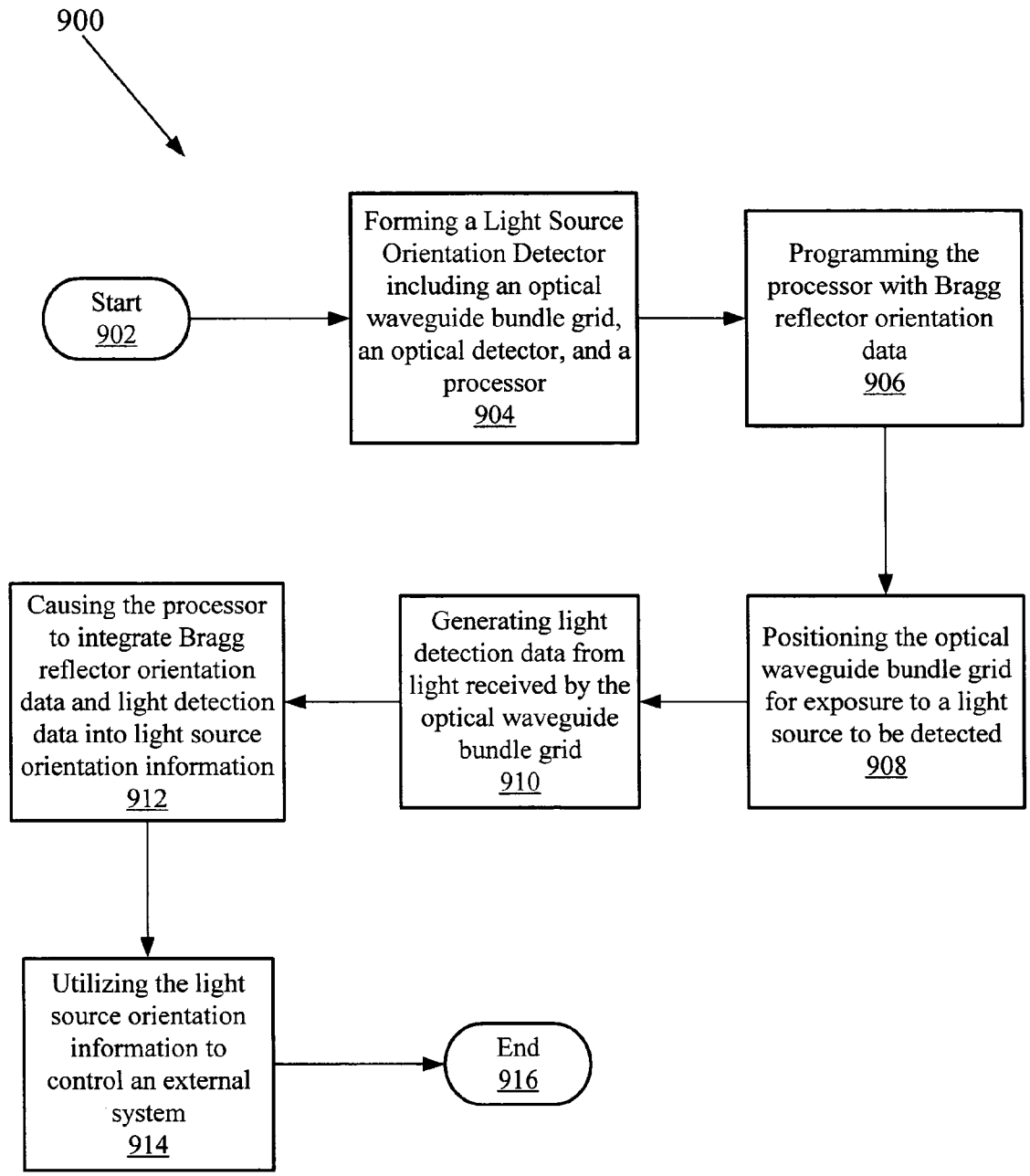
FIG. 9 is a flowchart of a method for using an implementation of the Light Source Orientation Detector of FIG. 1 including the optical waveguide bundle grid of FIG. 7 to detect light source orientation information.

FIG. 9 is a flowchart of a method 900 for using an implementation of the Light Source Orientation Detector of FIG. 1 including the optical waveguide bundle grid of FIG. 7 to generate and utilize light source orientation information. The method 900 starts at step 902, and at step 904 a Light Source Orientation Detector having a structure as discussed above with respect to FIGS. 1-7 may be formed. The Light Source Orientation Detector may include an optical waveguide bundle grid 700, one or more than one optical detectors such as optical detectors 126-130 in communication with optical fibers 714 in the optical waveguide bundle grid, and a processor such as processor 132 in communication with the one or more optical detectors.

At step 906, the processor such as processor 132 may be programmed with Bragg reflector orientation data regarding Bragg reflectors such as Bragg reflectors 724-734 that may be included in the optical waveguide bundle grid 700. At step 908, the optical waveguide bundle grid 700 may be positioned for exposure to a light source to be detected. As an example, the optical waveguide bundle grid 700 may be incorporated into an outer jacket or other garment to be worn by a soldier, law enforcement officer, or other human or animal weaponry target, configured so that the one or more optical detectors may be in communication with optical waveguides that may be in the form of optical fibers 714 and so that the processor may be in communication with the optical detectors, as earlier explained. In an implementation, a soldier or law enforcement officer may then wear the outer jacket or other garment while located in an area where enemy personnel operating laser-targeted weaponry may be present. As an example, the enemy personnel may attempt to "paint" the soldier or law enforcement officer with a laser for guiding bullets, missiles or the like to a target.

At step 910, the optical waveguide bundle grid 700 may be painted by the laser operated by the enemy personnel. Laser light received by Bragg reflectors 724-734 in the optical waveguide bundle grid 700 may then be detected by the optical detectors 126-130, which generate light detection data such as light intensity data for example.

At step 912, the processor 132 may receive and integrate the light detection data from the optical detectors 126-130 with Bragg reflector orientation data into light source orientation information. At step 914, the light source orientation information may be received by and utilized to control an end-use system. In an implementation, the end-use system 134 may be configured to defend the soldier or law enforcement officer from laser-targeted weaponry. As an example, the end-use system 134 may control the launch and targeting of defensive weaponry, or sound an alarm advising the soldier or law enforcement officer as to the location of the enemy personnel. As another example, the end-use system may be configured to control offensive weaponry in order to attack the laser light source and any enemy personnel that are operating the laser light source. The method may then end at step 916. It is understood that step 904 may as an example include forming an optical waveguide bundle but not forming an optical waveguide bundle grid. It is further understood that step 906 may be omitted, and that step 912 may include causing the processor to integrate light detection data into light source orientation information. It is additionally understood that step 914 may be omitted.

The Light Source Orientation Detectors 100 may be utilized in end-use applications where a flexible, durable and sensitive light detector is needed, the detector being capable of determining the orientation of a light source relative to the detector. The Light Source Orientation Detectors may readily be combined with other materials to form integral devices having a selected structure. As an example, a plurality of the Light Source Orientation Detectors 100 may be integrated with textile fibers into a fabric, which in turn may be formed into any selected fabric-based structure. As examples of fabric-based structures in addition to outer jackets, fabrics including the Light Source Orientation Detectors 100 may also be formed into tents, tarps, sails, hats, pants, vests and shirts.

While the foregoing description refers in some instances to optical fibers and Bragg reflectors, it is appreciated that the subject matter is not limited to these structures nor to the structures shown in the figures. Other waveguides such as planar waveguides may be substituted for optical fibers. Prism bars may be substituted for Bragg reflectors. Other shapes, configurations, numbers, and positions of optical waveguides, optical waveguide bundles, Bragg reflectors, prism bars, and optical waveguide bundle grids are included. Any end-use application that may benefit from utilization of a Light Source Orientation Detector as disclosed herein and shown in the drawings is included.

Moreover, it will be understood that the foregoing description of numerous implementations has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

What is claimed is:

1. An apparatus, comprising:
   an optical waveguide bundle, including a plurality of optical waveguides spaced apart around and substantially aligned along a waveguide bundle axis, each optical waveguide having a longitudinal core configured to transmit light;
   wherein two of the optical waveguides each include a Bragg reflector, the Bragg reflectors configured to couple light incident from a direction substantially transverse to the waveguide bundle axis into the optical waveguide in propagating modes;
   wherein each of the two optical waveguides is in optical communication with an optical detector configured to separately detect light from each of the two waveguides; and
   wherein the optical waveguides are held in alignment in the optical waveguide bundle by a core interposed between the optical waveguides.

2. The apparatus of claim 1, wherein each Bragg reflector is configured to couple light at one or more selected wavelengths into an optical waveguide, and the waveguide bundle core substantially does not transmit light at one or more of the selected wavelengths.

3. The apparatus of claim 1, having another optical waveguide bundle, wherein the optical waveguide bundles are included in an optical waveguide bundle grid.

4. The apparatus of claim 1, wherein each of the Bragg reflectors includes a prism bar having a row of prisms.

5. The apparatus of claim 1, wherein each of the Bragg reflectors includes a photonic crystal.

6. A process, comprising:
   forming a Bragg reflector integral with each of two optical waveguides, the optical waveguides each having a longitudinal core configured to transmit light;
   forming an optical waveguide bundle including the two optical waveguides being spaced apart around and substantially aligned along a waveguide bundle axis, each of the two Bragg reflectors configured to couple light incident from a direction substantially transverse to the waveguide bundle axis into one of the two optical waveguides in a propagating mode, wherein forming the optical waveguide bundle includes arranging the optical waveguides in alignment with a waveguide bundle core interposed between the optical waveguides; and
   placing each of the two optical waveguides in optical communication with an optical detector configured to separately detect light from each of the two waveguides.

7. The process of claim 6, wherein forming the Bragg reflectors includes configuring the Bragg reflectors to couple light at one or more selected wavelengths into an optical waveguide, and wherein the waveguide bundle core substantially does not transmit light at one or more of the selected wavelengths.

8. The process of claim 6, including forming another optical waveguide bundle, wherein the optical waveguide bundles are included in an optical waveguide bundle grid.

9. The process of claim 6, wherein forming each of the Bragg reflectors includes forming a prism bar having a row of prisms.

10. The process of claim 6, wherein forming each of the Bragg reflectors includes providing a photonic crystal.

11. A method of determining light source orientation information, comprising:
    providing an apparatus, having: an optical waveguide bundle, including two optical waveguides spaced apart around and substantially aligned along a waveguide bundle axis, each optical waveguide having a longitudinal core configured to transmit light; wherein the two optical waveguides each include a Bragg reflector, the Bragg reflectors configured to couple light incident from a direction substantially transverse to the waveguide bundle axis into the optical waveguide in a propagating mode; wherein each of the two optical waveguides is in optical communication with an optical detector configured to separately detect light from each of the two waveguides; and wherein the optical waveguide bundle includes optical waveguides held in alignment in the optical waveguide bundle by a core interposed between the optical waveguides;
    positioning the optical waveguide bundle for exposure to a light source to be detected;
    generating light detection data by detecting light incident into one of the two optical waveguides from a direction substantially transverse to the waveguide bundle axis into one of the two optical waveguides; and
    integrating the light detection data into light source orientation information.

12. The method of claim 11, wherein providing the apparatus includes configuring each Bragg reflector to couple light at one or more selected wavelengths into an optical waveguide, and configuring the waveguide bundle core to substantially not transmit light at one or more of the selected wavelengths.

13. The method of claim 11, wherein providing the apparatus includes forming another optical waveguide bundle, and wherein providing the apparatus includes forming the optical waveguide bundles into an optical waveguide bundle grid.

14. The method of claim 11, including:
    providing Bragg reflector orientation data, wherein integrating the light detection data includes integrating the Bragg reflector orientation data and the light detection data into the light source orientation information.

15. The method of claim 11, including utilizing the light source orientation information to control an end-use system.

16. The method of claim 11, wherein providing each of the Bragg reflectors includes providing a prism bar having a row of prisms.

17. The method of claim 11, wherein providing each of the Bragg reflectors includes providing a photonic crystal.

* * * * *